Feb. 22, 1966 F. H. VIVIAN 3,236,194
TRAILER TRACTOR MECHANISM FOR OPERATION OF TRAILER FRONT END
SUPPORTS ON RAIL CARS
Filed June 22, 1964 3 Sheets-Sheet 1
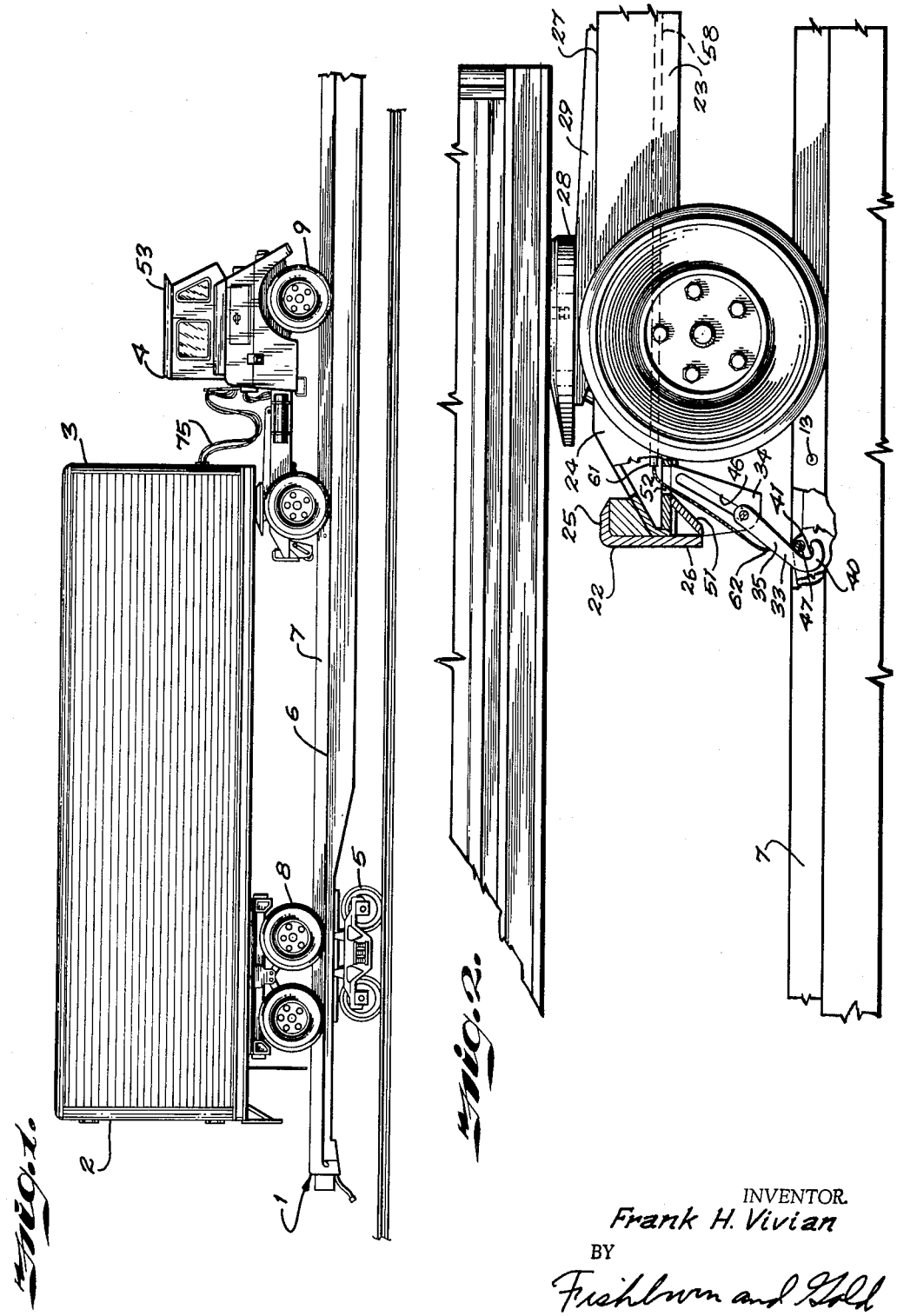
INVENTOR.
Frank H. Vivian
BY
Fishburn and Gold
ATTORNEYS

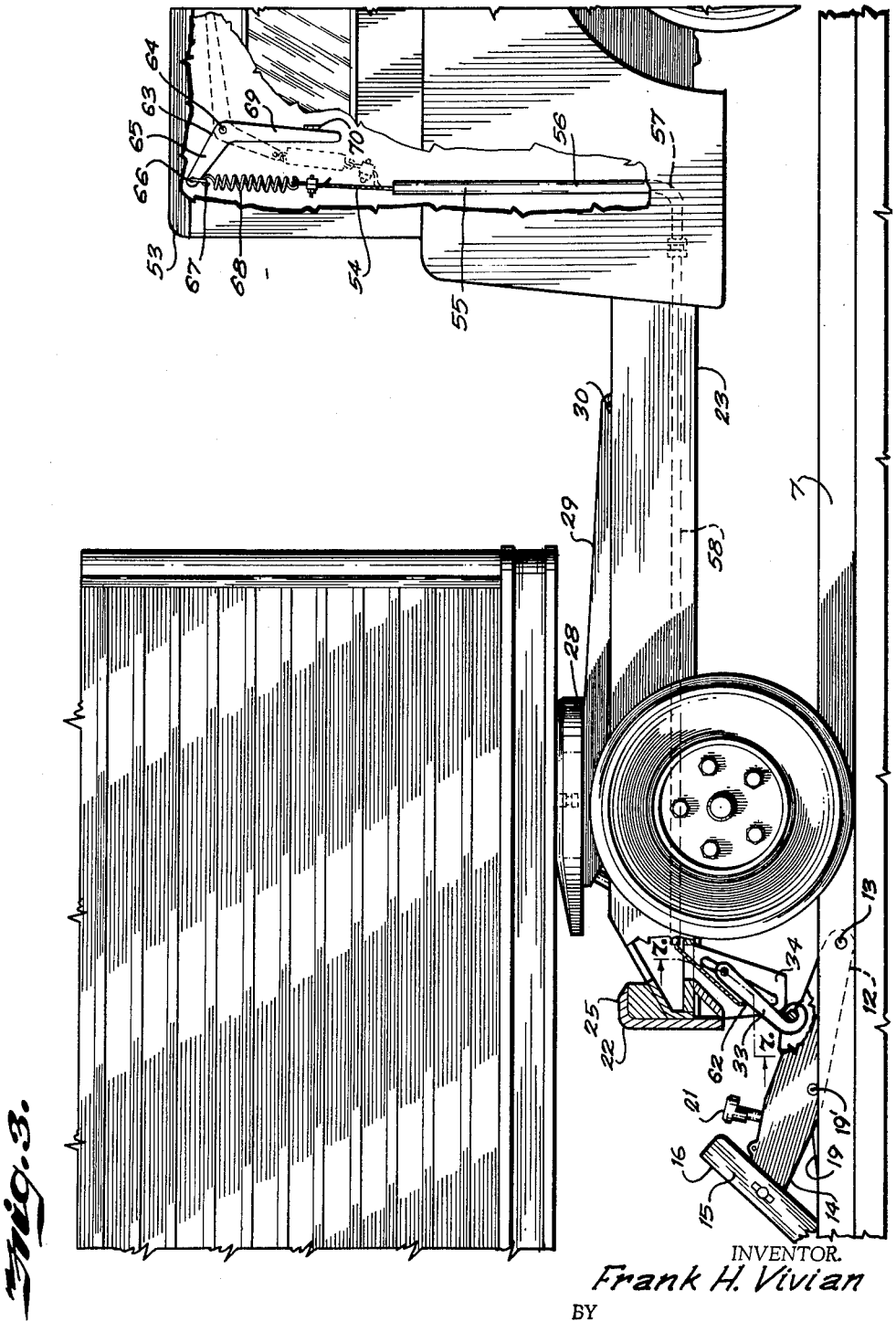

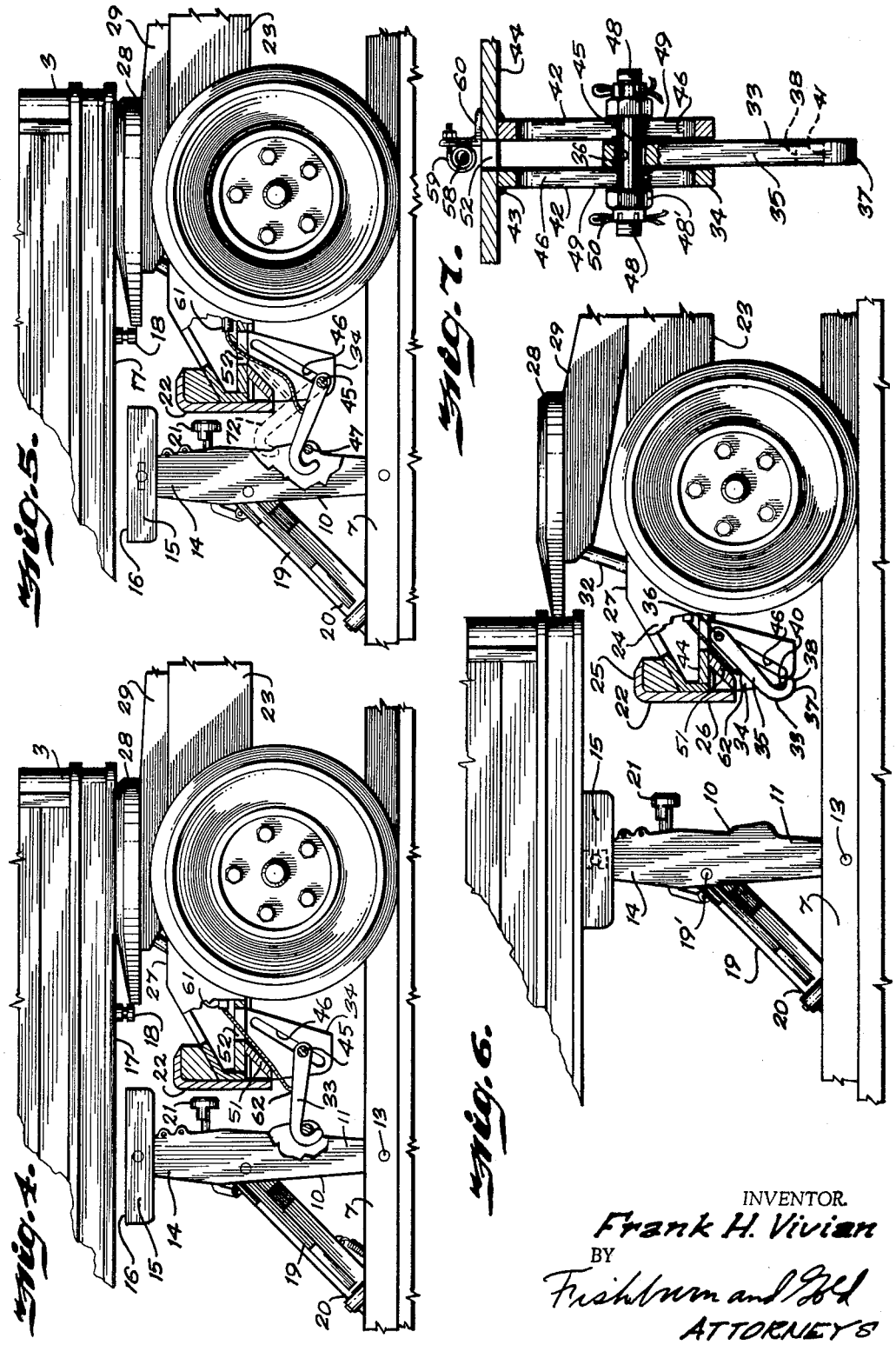

United States Patent Office 3,236,194
Patented Feb. 22, 1966

3,236,194
TRAILER TRACTOR MECHANISM FOR OPERATION OF TRAILER FRONT END SUPPORTS ON RAIL CARS
Frank H. Vivian, Ottawa, Kans., assignor, by mesne assignments, to Daybrook-Ottawa Corporation, Ottawa, Kans., a corporation of Delaware
Filed June 22, 1964, Ser. No. 376,831
6 Claims. (Cl. 105—368)

This invention relates to the loading and supporting of semi-trailers and the like on rail cars, and more particularly to a trailer tractor structure for operating a trailer front end support-hitch on rail cars.

It has become common in shipping to load material into semi-trailers and then by use of trailer tractors move the semi-trailer to a dock and onto a rail car, fasten the semi-trailer thereon and then disconnect the tractor to leave the semi-trailer in position on the rail car for travel to some destination where the trailer can be removed and pulled by a tractor to a point of unloading. Such operation is commonly called "piggy-back" hauling. While semi-trailers commonlly have legs or the like at the forward portion to support the front end when disconnected from a tractor, such legs are not designed to withstand shocks that occur during transporation. Therefore, additional or sturdier support is required for the front end of the trailer on the "piggy-back" shipments on rail cars to both support the front end and to aid in holding the trailer against forward or rearward movement. Rail cars similar to what is commonly termed "flat cars" have been arranged with guide tracks for facilitating movement of tractors and trailers longitudinally thereof and also front end support hitch devices for the semi-trailers have been arranged on such cars where the support will pivot to a position between the tracks when not in use and may be raised to a position to engage the underside of a semi-trailer in the forward portion and be locked in position to form a support with a jaw arrangement in the upper portion adapted to engage the kingpin on the tailer to secure same to the support. There are trailer tractors that may be over-the-road type tractors but usually the trailer tractors used in loading operations are of a type particularly adapted to move semi-trailers in dock areas and freight yards which have fifth wheel structures supporting for elevational movement to facilitate connecting to a semi-trailer wherein the front end height may vary and also to raise and lower the front end of the trailer when connected to the tractor.

The present invention contemplates railway cars for "piggy-back" operation with trailer front end support hitches mounted thereon and trailer tractors having variable height fifth wheel structures with mechanism on the tractor for connection to the support to raise same into trailer-supporting position as the tractor is maneuvered in the setting of the trailer in position on the car. The invention also contemplates a one man operation of the tractor in maneuvering the trailer on the car and the moving of the support, the support moving mechanism being actuated from within the cab of the tractor.

Further objects of the present invention are to provide a support raising mechanism including a hook movably mounted at the rear of the tractor and actuated by a flexible connection to an operating member in the cab of the tractor; to provide such a structure wherein the flexible connection with the hook is spaced from a pivotal guide thereon and arranged to effect pivotal as well as bodily movement of the hook; to provide a hook mounting structure at the rear of the tractor with cooperating guide or cam members on the mounting and on the hook in spaced relation to the hook portion for guided bodily movement of the hook in a defined path arranged with the flexible connection for applying force to the hook to effect the necessary pulling directions and swinging movement of the hook in the raising of the support on the rail car; to provide such a support operating mechanism on a tractor with a bumper at the rear to engage a lock release on the support; to provide the hook actuating mechanism with an extensible portion which biases the hook toward traveling position but extends under loading as when pulling a support into further supporting position; and to provide a tractor mounted mechanism for operating a trailer front end support on rail cars that is economical to manufacture and mount and is effiicent in operation and easily actuated by the tractor driver whereby the trailer may be positioned without the driver leaving the cab.

Other objects and advantage of this invention will become apparent from the following description taken in connection with the accompanying drawings wherein are set forth by way of illustration and example certain embodiments of this invention.

FIG. 1 is a side elevation of a rail car with a tractor moving a semi-trailer into "piggy-back" position thereon.

FIG. 2 is a partial side elevational view of the trailer and tractor with the hook lowered to engaged the front end trailer support prior to lifting same.

FIG. 3 is a partial side elevational view of a tractor and trailer on a rail car with the hook and actuating mechanism thereof in position partially raising the support, the release position of the hook actuating lever being shown in broken lines.

FIG. 4 is a partial side elevational view of a semi-trailer and tractor with the fifth wheel released and the tractor moved forwardly to pull the trailer support to upright latch position.

FIG. 5 is a similar view to FIG. 4 with the hook dropped to release position whereby force on the flexible member will swing the hook to disengaged position shown in broken lines.

FIG. 6 is a partial side elevational view of the tractor and trailer with the hook in traveling position and the fifth wheel engaging the trailer for the tractor to push same to engage the kingpin with the latch on the support.

FIG. 7 is a transverse sectional view through the tractor and hook support taken on the line 7—7, FIG. 3.

Referring more in detail to the drawings:

The reference numeral 1 generally designates a railway car adapted to receive and transport load-carrying bodies 2 such as semi-trailer bodies wherein the semi-trailers 3 are moved to and from the railway car by means of a mobile tractor 4. The railway car 1, as illustrated, is of a type supplied by General American Transportation Corporation of Chicago, Illinois, under the designation "G-85." In the structure shown in FIG. 1, the rear end portion of the railway car is supported by the usual wheel truck 5, and the forward end portion (not shown) is of substantially the same construction and support. The car is a flat car type with laterally spaced ways or guide tracks 6 on opposite sides of a raised portion 7 that extends longitudinally of the car, the ways 6 being adapted to receive wheels 8 of a semi-trailer and wheels 9 of a tractor in moving the semi-trailer 3 on and off of the rail car. For each trailer position adjacent the forward end thereof, a support hitch 10 is arranged on the rail car 1 substantially on the longitudinal center of the raised portion 7 and adapted to lie therein when in a lowered position as during the movement of a trailer or tractor vehicle thereover.

The present invention relates to mechanism on the trailer-tractor 4 for operating the support hitch 10 in the movement of a semi-trailer on and off the rail car 1. The support hitch 10 and the rail car structure per se are not a part of this invention. The support hitch 10 generally consists of an arm member 11 having one end 12 pivotally mounted as at 13 on the rail car 1 for up and down swinging movement of said arm member. The other end 14 of the arm 11 carries a head 15 having an upper surface 16 adapted to be engaged by an under surface 17 of a trailer body 2 in the area surrounding the kingpin 18. The head 15 includes structure (not shown) for engaging and locking the kingpin 18 therein with the surface 16 in supporting engagement with the surface 17 of a trailer body 2. A brace member 19 has one end pivotally mounted as at 19' on the arm 11 in spaced relation to the pivot point 13, the brace member 19 being arranged whereby the other end 20 is rearwardly of the arm 11 when in lowered position. As the arm is moved to upright position, illustrated in FIG. 6, the brace member extends downwardly and rearwardly with the end portion 20 engaging the railway car and in a locked position by latches (not shown). An abutment member 21 extends forwardly from the arm 11 when in upright latched position sufficiently to be engaged by a bumper member 22 on a tractor 4 as the tractor is moved rearwardly under the forward portion of the trailer body and movement of the abutment member 21 rearwardly will release the brace member latches and the kingpin latches as a part of the connecting of the trailer to the tractor for removal of the trailer from the rail car.

The tractor 4 is of the type having a longitudinal frame 23 with a rear end portion 24 to which is secured the transverse member forming the bumper 22. In the structure illustrated, the bumper member 22 is generally angle-shaped with one leg 25 extending forwardly from a depending vertical leg 26, the upper surface of the leg 25 being below the upper surface 27 of the longitudinal frame members 23. A conventional fifth wheel structure 28 is carried by the rear portions of arms 29 that are pivotally mounted as at 30 on the frame members 23 for up and down swinging movement of the arms and the fifth wheel carried thereby. Suitable means is mounted on the frame 23 for raising and lowering the fifth wheel, as for example a hydraulic ram, the piston rod of which is indicated at 32, FIG. 6, the fifth wheel lifting means being such that it is capable of lifting the forward end of a loaded semi-trailer body 2.

The tractor 4 has mechanism carried thereby for engaging the support arm 11 and raising same to a trailer body supporting position wherein the brace latches automatically lock. This mechanism for raising the support arm includes a hook member 33 movably carried by guide structure 34 adjacent the rear end of the tractor frame. In the structure illustrated, the hook member 33 has an elongated shank 35 with an eye 36 at one end thereof and the other end portion reversely curved as at 37 and terminating in a nose 38 spaced from the shank to form a hook 40 with an article-receiving recess 41 between the nose and shank. The hook member is arranged whereby the eye 36 is pivotally and movably mounted on the support 34 whereby the article-receiving recess of the hook faces downwardly or forwardly relative to the tractor. The eye 36 is moved in a defined path that preferably inclines downwardly and rearwardly of the tractor. In the structure illustrated, the guide structure 34 consists of laterally spaced plates 42 with upper ends or edges 43 secured as by welding to a stiffener plate 44 that is suitably secured as by welding to the under side of the frame members 23 whereby the spaced plates 42 depend from the frame at the rear end portion thereof. The hook member 33 has its eye 36 pivotally mounted on a pin or bolt 45 slidably mounted in ways or tracks 46 that are in the form of elongated slots in the plates 42. The tracks 46 define the path of movement of the eye end and cooperate with a cable and loading on the hook to act as a cam in controlling movement of the hook, particularly in engaging and disengaging the hook from a transverse bar 47 in the hitch support arm 11.

In the structure illustrated, the bolt 45 has threaded ends 48 and said bolt extends through the slots 46 with nuts 48' threaded on the end portions of the bolt to slidably engage outer faces 49 of the plates 42 and cooperate with the ways or tracks 46 in guiding the movement of the hook member 33. The nuts 48' are preferably secured in place by keeprs such as cotterpins 50. The spacing between the plates 42 is such that the hook member 33 is movable therebetween with the eye end 36 of the hook pivotally mounted on the bolt 45. The guide structure 34 has a transverse stiffener plate 51 between the plates 42 and spaced upwardly and rearwardly from the tracks 46, as illustreted in FIG. 2. The stiffener plate 51 preferably engages the lower portion of the bumper leg 26 and is secured to the plate member 44 at the rear of an aperture or passage 52 through said plate 44, said passage being located above the upper end portion of the track or slots 46 for movement of a cable or flexible line therethrough, as later described.

The movement of the trailer body support hitch and the movement of the trailer body onto the car by the tractor are preferably performed under the control of one operator who is the driver of the tractor. Therefore, movement of the hook member 33 is performed from within the cab 53 of the tractor 4. A flexible line or cable 54 extends from within the cab 53 through the passage 52 and has an end connected to the hook shank 35. The cable preferably is such that force in either direction will effect corresponding movement of the hook. Therefore, the cable extends through a guide 55 in the form of a tube through which the cable is sleeved. In the structure illustrated, the cable guide 55 has an upright portion 56 in the cab that extends downwardly and is connected by a curved portion 57 with a substantially horizontal portion 58 suitably fixed to the frame by suitable fastening devices such as J bolts 59 to angle brackets 60 secured to the frame. The horizontal portion of the guide 55 terminates in an open end 61 at the forward end of the passage 52 whereby the rear end portion of the cable extends from said tubular guide through the passage 52 and is secured as at 62 to the shank 35 substantially midway between the eye 36 and hook 40 on the back side of said shank or opposite from the hook opening, as illustrated in FIG. 2.

An actuating lever 63 is pivotally mounted as at 64 in the cab 53 and has one arm 65 with the end 66 thereof operatively connected to an end 67 of the cable 34. It is preferred that a resilient enlongatable member such as a coil spring 68 be arranged to provide an elongatable connection between the lever arm 65 and the cable. The lever has a second arm 69 which is grasped by the operator to swing the arm portion 65 to move the cable 54. The arm portion 69 is engageable behind a keeper member 70 when the lever is moved to apply tension to the cable to hold the hook member in traveling position or during raising movement of the support hitch as later described, the lever arm 69 being releasable from the keeper to allow the lever to swing in a counterclockwise direction, FIG. 3, to relax the tension on the cable 54.

In using a structure constructed and assembled as described, for moving a semi-trailer body 2 onto a rail car 1, the rail car is positioned with an end at a dock with a ramp or the like (not shown) extending in alignment with the longituidnal track portions 6. The semi-trailer 3 connected to a tractor 4 is then moved on the dock and positioned whereby the rear of the semi-trailer is in longitudinal alignment with the rail car. The tractor and trailer are then backed onto the rail car with the wheels 8 and 9 engaging the tracks 6 with the movement continued until the trailer is positioned approximately as illustrated in FIG. 1, and the hook portion substantially over the bar 47 of the support hitch member. Then, the lever arm 69 is released from the keeper 70 and said lever swung in a counter-clockwise direction, FIG. 3, releasing the tension on the cable 54 and moving the cable through the tubular guide and out the open rear end thereof and through the passage 52 to allow the hook member 33 to drop with the bolt 45 sliding downwardly in the ways 46 whereby the hook member moves downwardly and rearwardly and the hook 40 drops rearwardly of the bar 47 as illustrated in FIG. 2. The lever 63 is then swung in a clockwise direction, FIG. 3, raising the hook member whereby the bolt 45 slides in the ways 46, the hook member moving upwardly and forwardly engaging the hook portion 40 with the bar 47. The force on the cable and the tension on the spring 68 may lift the support hitch member 11 to a partially elevated position as the lever arm 69 is moved behind the keeper 70 to latch said lever in position to maintain tension on the cable 54 as illustrated in FIG. 3. Then, the tractor is put into gear and also the latch on the fifth wheel 28 is released and the mechanism 32 actuated to raise the fifth wheel 28 whereby the lower surface 17 of the trailer body is elevated to a position above the raised position of the surface 16 of the head 15 on the hitch support. The tractor is then moved forwardly, the fifth wheel sliding on the surface 17 as the trailer body remain stationary. This forward movement applies forced to the hook member 33, raising the hitch support but downward and rearward movement of the hook member allows the bumper 22 to be spaced from the abutment 21 as the hitch support moves to upright position so as not to interfere with operation of the latches on the hitch support so that said hitch support can be moved to a complete upright position and the brace member automatically locked in place whereby the parts are positioned as illustrated in FIG. 4. Then the lever is moved to release the tension on the cable 54 whereby the hook moves downwardly in the guide slots 46 which moves the hook portion rearwardly of the bar 47 as shown in FIG. 5. Then the lever 63 is moved to pull up on the cable to first swing the hook upwardly as illustrated at the broken line 72 in FIG. 5 to release the hook from the bar 47. Then the tension on the cable 54 will pull the bolt 45 upwardly and forwardly in the ways 46 so that as the hook portion 40 is moving forwardly beyond the bar 47 so that the hook is drawn into a traveling position as illustrated in FIG. 6. The fifth wheel 28 is then lowered whereby the trailer body is lowered to engage the surface 17 with the surface 16 of the head 15 on the support hitch and the tractor moved forwardly whereby the fifth wheel is forwardly of the front of the trailer body and then the fifth wheel is raised and the tractor moved rearwardly to engage the forward end of the trailer body by the fifth wheel and further rearward movement of the tractor will then force the trailer rearwardly until the kingpin moves into the head 15 and is engaged by the latches thereof. The brake and light connections 75 are then released whereby the brakes on the wheels 8 are set and the tractor driven from the rail car.

When it is desired to remove a trailer 3 from a rail car 1, the rail car bearing the trailer is moved to a dock or ramp whereby the tractor 4 can be backed thereon and then the tractor with the fifth wheel in lowered position is backed until the fifth wheel is under the forward end of the trailer body 2. Continued rearward movement will cause the bumper 22 to engage the abutment 21 forcing same backwardly to automatically release the latches holding the kingpin and then the fifth wheel is elevated to engage the bottom of the forward end of the trailer body and elevate said body slightly to take the weight off of the hitch support. Then further rearward movement of the tractor causes the bumper to further push the abutment 21 releasing the latch on the brace arm, allowing the support hitch 11 to fold or swing rearwardly to a lowered position. Rearward movement of the tractor is continued until the fifth wheel receives the kingpin and the kingpin is then latched therein. The fifth wheel is lowered to traveling position, the brake and light connections 75 are made with the trailer, and then the tractor 4 moved forwardly to pull the trailer therebehind and move same from the rail car 1. It is believed that the hook arrangement provides a one man operation for control thereof to lift the hitch support while the man is operating the tractor and the cam trackways and cooperation of the cable connection provides a controlled hook movement and trouble-free operation.

It is to be understood that while I have illustrated and described one form of my invention, it is not to be limited to the specific form or arrangement of the parts herein described and shown except insofar as such limitations are included in the claims.

What I claim and desire to secure by Letters Patent is:

1. In a trailer-tractor having a mobile frame with a cab mounted thereon forwardly of a rear end of the frame, a guide member having laterally spaced portions mounted on said frame adjacent the rear end thereof in depending relation thereto, said guide portions having guide trackways inclined downwardly and rearwardly from upper portions of said guide member, a hook member having an elongate shank with a reverse curve portion at one end forming a hook portion, means movable in said trackways and pivotally supporting the other end of the hook member shank with the hook entrant opening forwardly of the shank, a tubular guide fixed on said frame with one end opening adjacent to and above the trackways and the other end opening in the cab, an elongate flexible member extending through said tubular guide with one end secured to the hook shank rear substantially midway between ends thereof and the other end extending into said cab, a lever member in the cab operatively connected to the other end of the flexible line whereby movement of the lever effects movement of the hook member relative to said trackway, and a resilient elongatable connection between said other end of the elongate flexible member and the lever forming a yielding connection that permits movement of the hook member in response to change of forces acting thereon in opposition to tension on the flexible member.

2. In a trailer-tractor having a mobile frame with a cab mounted thereon forwardly of a rear end of the frame, a guide member having laterally spaced portions mounted on said frame adjacent the rear end thereof in depending relation thereto, said guide portions having guide trackways inclined downwardly and rearwardly from upper portions of said guide member, a hook member having an elongate shank with a reverse curve portion at one end forming a hook portion, means movable in said trackways and pivotally supporting the other end of the hook member shank with the hook entrant opening forwardly of the shank, a tubular guide fixed on said frame with one end opening adjacent to and above the trackways and the other end opening in the cab, an elongate flexible member extending through said tubular guide with one end secured to the hook shank rear substantially midway between ends thereof and the other end extending into said cab, said guide member being a plate portion secured to the rear end of the mobile frame with laterally spaced depending plates on said plate with elongate aligned slots in said depending plates forming the trackway and the means movable in the trackway being an elongate bolt extending through the slots and said other end of the hook shank having an eye mounted on the bolt for pivotal mounting of said hook member, said first-named plate having an aperture therein adjacent the upper ends of the slots and the elongate flexible member extending through said aperture with the tubular guide having its opening adjacent said aperture.

3. A trailer-tractor for moving semi-trailers onto flat cars having wheel guide rails and a trailer front end support hitch swingable from a lowered position to an upright latched position and a transverse bar on said support hitch for engagement by a lifting means, a mobile frame having front and rear ends and a cab therebetween and an elevatable fifth wheel carried on the frame rearwardly of the cab, laterally spaced guide plates fixed to the frame in depending relation adjacent the rear end thereof, guide trackways on said guide plates and having a downwardly and rearwardly inclined relation to said frame, a hook member having an elongate shank with a return bend defining a hook at one end and a transverse member at the other end slidably engaged in said guide trackways for pivotal movement of the hook member and bodily movement longitudinally of the trackway, said hook portion having an entrant opening downwardly and forwardly thereof, a flexible elongated member having one end secured to the hook member shank intermediate the transverse member and the hook portion, and means in the cab with an elongatable connection to the other end of the flexible member for moving the hook member in connecting and disconnecting same from the transverse bar of the support hitch whereby tension on the flexible member by the means in the cab holds the transverse member of the hook member in the upper portion of the trackway and release of tension on the flexible member permits the hook member to drop in a rearwardly and downward movement so that when positioned over the transverse member of the support hitch the hook portion will be moved to a position to engage same in response to application of tension on the flexible member and forward movement of the tractor will raise the support hitch into an upright position.

4. A trailer-tractor for moving semi-trailers onto flat cars having wheel guide rails, and a trailer front end support hitch swingable from a lowered position to an upright latched position and a transverse bar on said support hitch for engagement by a lifting means, a mobile frame having front and rear ends and a cab therebetween and an elevatable fifth wheel carried on the frame rearwardly of the cab, laterally spaced guide plates fixed to the frame in a depending relation adjacent the rear end thereof, bumper means secured to the frame at the rear end and extending transversely thereof, guide trackways on said guide plates and having a downwardly and rearwardly inclined relation to said frame, a hook member having an elongate shank with a return bend defining a hook at one end and a transverse member at the other end slidably engaged in said guide trackways for pivotal movement of the hook member and bodily movement longitudinally of the trackway, said hook portion having an entrant opening downwardly and forwardly thereof, a flexible elongated member having one end secured to the hook member shank intermediate the transverse member and the hook portion, a tubular guide means extending from adjacent the upper end of the trackways to the interior of the cab, said elongate flexible member extending through the tubular guide means and having the other end in said cab, and means in the cab with an elongatable connection to said other end of the flexible member for moving the hook member in connecting and disconnecting same from the transverse bar of the support hitch whereby tension on the flexible member by the means in the cab holds the transverse member of the hook member in the upper portion of the trackway and release of tension on the flexible member permits the hook member to drop in a rearwardly and downward movement so that when positioned over the transverse member of the support hitch the hook portion will be moved to a position to engage same in response to application of tension on the flexible member and forward movement of the tractor will raise the support hitch into an upright position, the hook member moving downwardly and rearwardly in the trackway in response to the force required for lifting the support hitch whereby rearward movement of the tractor will permit the tension on the flexible member to swing the hook member into released position.

5. A hook and guide structure as set forth in claim 4 wherein the guide member is a plate portion secured to the rear end of the mobile frame with laterally spaced depending plates on said plate portion with elongate aligned slots in said depending plates forming the trackway and the transverse member movable in the trackway being an elongate bolt extending through the slots and said other end of the hook shank having an eye mounted on the bolt for pivotal mounting of said hook member, said first-named plate having an aperture therein adjacent the upper ends of the slots and the elongate flexible member extending through said aperture with the tubular guide having its opening adjacent said aperture.

6. A trailer-tractor for moving semi-trailers onto flat cars having wheel guide rails and a trailer front end support hitch swingable from a lowered position to an upright latched position and a transverse bar on said support hitch for engagement by a lifting means, a mobile frame having front and rear ends and a cab therebetween and an elevatable fifth wheel carried on the frame rearwardly of the cab, laterally spaced guide plates fixed to the frame in depending relation adjacent the rear end thereof, bumper means secured to the frame at the rear end and extending transversely thereof, guide trackways on said guide plates and having a downwardly and rearwardly inclined relation to said frame, a hook member having an elongate shank with a return bend defining a hook at one end and a transverse bolt at the other end slidably engaged in said guide trackways for pivotal movement of the hook member and bodily movement longitudinally of the trackway, said hook portion having an entrant opening downwardly and forwardly thereof, a flexible elongated member having one end secured to the hook member shank intermediate the transverse member and the hook portion, a tubular guide means extending from adjacent the upper end of the trackways to the interior of the cab, said elongate flexible member extending through the tubular guide means and having the other end in said cab, a lever pivotably mounted in the cab, and an elongatable spring having one end connected to said other end of the flexible member and the other end connected to said lever to apply tension on the flexible member and hold the transverse bolt of the hook member in the upper portion of the trackway when the lever is in one position and movement of the lever to a second position releases tension on the flexible member permitting the hook member to drop in a rearwardly and downward movement so that when positioned over the transverse member of the support hitch the hook portion will be moved to a position to engage same in response to movement of the lever to said one position and tension on the flexible member and forward movement of the tractor will raise the support hitch into an upright position, the hook member moving downwardly and rearwardly in the trackway in response to the force required for lifting the support hitch whereby rearward movement of the tractor will permit the tension on the flexible member to swing the hook member into released position.

References Cited by the Examiner
UNITED STATES PATENTS

| | | | |
|---|---|---|---|
| 2,767,017 | 10/1956 | Enriquez | 298—23 |
| 2,958,560 | 11/1960 | Allison | 298—23 |
| 3,022,092 | 2/1962 | Bunting et al. | 280—479 |
| 3,050,320 | 8/1962 | Clejan | 105—368 |
| 3,077,278 | 2/1963 | Alexander | 214—517 |

ARTHUR L. LA POINT, *Primary Examiner.*